United States Patent Office 3,013,982
Patented Dec. 19, 1961

3,013,982
METAL LOADING OF MOLECULAR SIEVES
Donald W. Breck, Tonawanda, and Robert M. Milton, White Plains, N.Y., assignors to Union Carbide Corporation, a corporation of New York
No Drawing. Filed Sept. 24, 1958, Ser. No. 762,951
11 Claims. (Cl. 252—455)

This invention relates to a process for preparing metal-loaded zeolitic molecular sieves which are suitable for use as catalysts, scavengers and getters.

The use of metals as catalysts, scavengers, and getters in a number of chemical reactions and chemical systems is well known to the art. The effectiveness of the metal in such cases has been found to depend, to a considerable degree, on the form in which the metal is present in the reaction zone.

It is an object of this invention to provide a process for introducing metals into the internal adsorption area of zeolitic molecular sieves to provide superior catalysts, scavengers and getters.

Other objects will be apparent from the subsequent disclosure and appended claims.

The process which satisfies the objects of the present invention comprises intimately contacting a zeolitic molecular sieve with an aqueous solution of a water-soluble salt of the metal to be deposited in the inner sorption area of the zeolitic molecular sieve whereby ion-exchange of the metal cations of the zeolitic molecular sieve and the aqueous solution occurs; separating the zeolitic molecular sieve from the aqueous exchanging solution; drying said zeolitic molecular sieve whereby substantially all of the water is removed from the said zeolitic molecular sieve; and intimately contacting said zeolitic molecular sieve with a reducing agent whereby the cations of said metal to be deposited which are present in the molecular sieve structure are reduced to the elemental metal.

Zeolitic molecular sieves, both natural and synthetic, are metal aluminosilicates. The crystalline structure of these materials is such that a relatively large adsorption area is present inside each crystal. Access to this area may be had by way of openings or pores in the crystal. Molecules are selectively adsorbed by molecular sieves on the basis of their size and polarity among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example, an ion of an alkali metal, and alkaline earth metal, ammonia, amine complexes, or hydrogen. One cation may be exchanged for another by conventional ion-exchange techniques. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied by reduced elemental metal atoms will be available for adsorption of molecules having a size, shape, and energy which permits entry of the adsorbate molecules into the pores of the molecular sieves.

The zeolitic molecular sieves to be useful in the present invention, must be capable of adsorbing oxygen molecules at the normal boiling point of oxygen. Included among these are the preferred natural zeolitic molecular sieves, chabazite, faujasite, erionite, mordenite, gmelinite, and the calcium form of analcite, and the preferred synthetic zeolitic molecular sieves, zeolite A, D, L, R, S, T, X and Y. The natural materials are adequately described in the chemical art. The characteristics of the synthetic materials and processes for making them are provided below.

The general formula for zeolite X, expressed in terms of mol fractions of oxides, is as follows:

$$0.9 \pm 0.2 M_{\frac{2}{n}}O : Al_2O_3 : 2.5 \pm 0.5 SiO_2 : 0 \text{ to } 8H_2O$$

In the formula "M" represents a cation, for example hydrogen or a metal, and "n" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substatnially all of the adsorbed water.

The cation represented in the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is $$0.9\ Na_2O : Al_2O_3 : 2.5SiO_2 : 6.1H_2O$$

The major lines in the X-ray diffraction pattern of zeolite X are set forth in Table A below:

TABLE A

| $d$ Value of Reflection in A. | 100 $I/I_0$ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the KoC doublet of copper, and a Geiger counter spectrometer with a strip chart pen recorder was used. The peak heights, I, and the positions as a function of $2\theta$, where $\theta$ is the Bragg angle, were read from the spectrometer charge. From these, the relative intensities, $$\frac{100I}{I_0}$$

where $I_0$ is the intensity of the strongest line or peak, and $d$(obs), the interplanar spacing in A., corresponding to the recorded lines were calculated. The X-ray patterns indicate a cubic unit cell of dimensions between 24.5 A. and 25.5 A.

To make sodium zeolite X, reactants are mixed in aqueous solution and held at about 100° C. until the crystals of zeolite X are formed. Preferably the reactants should be such that in the solution the following ratios prevail:

$SiO_2/Al_2O_3$ —————————————————— 3–5
$Na_2O/SiO_2$ —————————————————— 1.2–1.5
$H_2O/Na_2O$ —————————————————— 35–60

The general formula for zeolite A, expressed in terms of mol fractions of oxides is as follows:

$$1.0 \pm 0.2 M_{\frac{2}{n}}O : Al_2O_3 : 1.85 \pm 0.5 SiO_2 : YH_2O$$

In the formula, "M" represents a metal and "n" its valence, and "Y" may be any value up to 6. The zeolite is activated, or made capable of adsorbing certain molecules by the removal of water from the crystal, as by heating. Thus the actual number of mols of water present in the crystal will depend upon the degree of dehydration or activation of the crystal.

As in the case of zeolite X, the metal represented in the formula by the letter "M" can be changed by conventional ion-exchange techniques. For purposes of convenience the sodium form of zeolite A, designated sodium zeolite A, is synthesized and other forms obtained by the modification of the sodium zeolite A.

A typical formula for sodium zeolite A is $$0.99Na_2O:1.0Al_2O_3:1.85SiO_2:5.1H_2O$$

The major lines in the X-ray diffraction pattern of zeolite A are set forth in Table B below:

TABLE B

| $d$ Value of Reflection in A. | 100 $I/I_0$ |
|---|---|
| 12.2±0.2 | 100 |
| 8.6±0.2 | 69 |
| 7.05±0.15 | 35 |
| 4.07±0.08 | 36 |
| 3.68±0.07 | 53 |
| 3.38±0.06 | 16 |
| 3.26±0.05 | 47 |
| 2.96±0.05 | 55 |
| 2.73±0.05 | 12 |
| 2.60±0.05 | 22 |

The same procedures and techniques were employed in obtaining the patterns described in Tables A and B.

To make sodium zeolite A, reactants are mixed in aqueous solution and heated at about 100° C. until the crystals of zeolite A are formed. Preferably the reactants should be such that in the solution the following ratios prevail:

$SiO_2/Al_2O_3$ ......................................... 0.5–1.3
$Na_2O/SiO_2$ ......................................... 1.0–3.0
$H_2O/Na_2O$ ......................................... 35–200

The chemical formula for zeolite Y expressed in terms of oxides mole ratios may be written as $$0.9\pm0.2Na_2O:Al_2O_3:WSiO_2:XH_2O$$

wherein "W" is a value greater than 3 up to about 5 and "X" may be a value up to about 9.

Zeolite Y has a characteristic X-ray powder diffraction pattern which may be employed to identify zeolite Y. The X-ray powder diffraction data are shown in Table C. The values for the interplanar spacing, $d$, are expressed in angstrom units. The relative intensity of the lines of the X-ray powder diffraction data are expressed as VS, very strong; S, strong; M, medium; W, weak; and VW, very weak.

TABLE C

| $hkl$ | $h^2+k^2+l^2$ | $d$ in A. | Intensity |
|---|---|---|---|
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–5.08 | M |
| 440 | 32 | 4.37–4.79 | M |
| 620 | 40 | 3.90–4.46 | W |
| 533 | 43 | 3.77–3.93 | S |
| 444 | 48 | 3.57–3.79 | VW |
| 551, 711 | 51 | 3.46–3.48 | VW |
| 642 | 56 | 3.30–3.33 | S |
| 553, 731 | 59 | 3.22–3.24 | W |
| 733 | 67 | 3.02–3.04 | M |
| 660, 822 | 72 | 2.91–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 931 | 91 | 2.59–2.61 | M |
| 844 | 96 | 2.52–2.54 | VW |
| 802; 10, 2, 0 | 104 | 2.42–2.44 | VW |
| 666; 10, 2, 2 | 108 | 2.38–2.39 | M |
| 775; 11, 1, 1 | 123 | 2.22–2.24 | VW |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.94 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10, 10, 0; 14, 2, 0 | 200 | 1.75–1.78 | W |
| 997; 11, 9, 3 | 211 | 1.70–1.71 | W |

When an aqueous colloidal silica sol employed as the major source of silica, zeolite Y may be prepared by preparing an aqueous sodium aluminosilicate mixture having a composition, expressed in terms of oxide-mole-ratios, which falls within one of the following ranges:

| | Range 1 | Range 2 | Range 3 |
|---|---|---|---|
| $Na_2O/SiO_2$ | 0.20 to 0.40 | 0.41 to 0.61 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole-ratios, falling within one of the following ranges:

| | Range 1 | Range 2 | Range 3 |
|---|---|---|---|
| $Na_2O/SiO_2$ | 0.6 to 1.0 | 1.5 to 1.7 | 1.9 to 2.1 |
| $SiO_2/Al_2O_3$ | 8 to 30 | 10 to 30 | about 10 |
| $H_2O/Na_2O$ | 12 to 90 | 20 to 90 | 40 to 90 | maintaining the mixture at a temperature of about 100° C. until crystals are formed, and separating the crystals from the mother liquor.

The composition of zeolite L, expressed in terms of mole ratios of oxides, may be represented as follows:

$$1.0\pm0.1M_{\frac{2}{n}}O:Al_2O_3:6.4\pm0.5SiO_2:yH_2O$$

wherein "M" designates a metal, "$n$" represents the valence of "M"; and "$y$" may be any value from 0 to about 7.

The more significant $d$(A.) values, i.e., interplanar spacings, for the major lines in the X-ray diffraction pattern of zeolite L, are given below in Table D.

TABLE D

| | |
|---|---|
| 16.1±0.3 | 3.17±0.01 |
| 7.52±0.04 | 3.07±0.01 |
| 6.00±0.02 | 2.91±0.01 |
| 4.57±0.03 | 2.65±0.01 |
| 4.35±0.04 | 2.46±0.01 |
| 3.91±0.02 | 2.42±0.01 |
| 3.47±0.02 | 2.19±0.01 |
| 3.28±0.02 | |

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal alumino-silicate mixture having a composition, expressed in terms of mole ratios of oxides falling within the following range:

K$_2$O/(K$_2$O+Na$_2$O) _____ From about 0.33 to about 1.
(K$_2$O+Na$_2$O)/SiO$_2$ _____ From about 0.4 to about 0.5.
SiO$_2$/Al$_2$O$_3$ _____ From about 15 to about 28.
H$_2$O/(K$_2$O+Na$_2$O) _____ From about 15 to about 41.

maintaining the mixture at a temperature of about 100° C. until crystallization occurs, and separating the crystals from the mother liquor.

The chemical formula for zeolite D may be written, in terms of oxides, as follows:

$$0.9 \pm 0.2[x\text{Na}_2\text{O}:(1-x)\text{K}_2\text{O}]:\text{Al}_2\text{O}_3:w\text{SiO}_2:y\text{H}_2\text{O}$$

wherein "$x$" is a value from 0 to 1, "$w$" is from about 4.5 to about 4.9, and "$y$," in the fully hydrated form, is about 7. In the preferred form of zeolite $d$, "$x$" is in the range of from 0.4 to 0.6.

Zeolite D has an X-ray powder diffraction pattern substantially like that shown in Table E.

TABLE E

*X-ray diffraction patterns of zeolite D*

[$d$=interplanar spacing in A.: I/I max.=relative intensity]

| Zeolite D | |
|---|---|
| d, A. | I/I max. |
| 9.42 | 66 |
| 6.89 | 67 |
| 5.54 | 15 |
| 5.03 | 62 |
| 4.33 | 62 |
| 3.98 | 27 |
| 3.89 | 23 |
| 3.60 | 12 |
| 3.45 | 39 |
| 3.19 | 15 |
| 2.94 | 100 |
| 2.69 | 9 |
| 2.61 | 38 |
| 2.30 | 16 |
| 2.09 | 22 |
| 1.81 | 29 |
| 1.73 | 23 |

Zeolite D may be prepared as follows:
A sodium-potassium aluminosilicate-water mixture is prepared such that the initial composition of the reactant mixture in terms of oxide-mole-ratios is:

$$\frac{\text{Na}_2\text{O} + \text{K}_2\text{O}}{\text{SiO}_2} = 0.45 \text{ to } 0.65$$

$$\frac{\text{Na}_2\text{O}}{\text{Na}_2\text{O} + \text{K}_2\text{O}} = 0.74 \text{ to } 0.92$$

$$\frac{\text{SiO}_2}{\text{Al}_2\text{O}_3} = \text{about } 28$$

$$\frac{\text{H}_2\text{O}}{\text{Na}_2\text{O} + \text{K}_2\text{O}} = 18 \text{ to } 45$$

The mixture is maintained at a temperature within the range of about 100° C. to 120° C. until crystals are formed; the crystals are then separated from the mother liquor.

The chemical formula for zeolite R may be written as:

$$0.9 \pm 0.2 \text{Na}_2\text{O}:\text{Al}_2\text{O}_3:W\text{SiO}_2:X\text{H}_2\text{O}$$

wherein "W" is from 3.45 to 3.65, and "X," for the fully hydrated form, is about 7.

Zeolite R has an X-ray powder diffraction pattern substantially like that shown in Table F.

TABLE F

*X-ray diffraction patterns of zeolite R*

[$d$=interplanar spacing in A.: I/I max.=relative intensity]

| Zeolite R | |
|---|---|
| d, A. | 100 (I/I max.) |
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 3.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

Zeolite R may be prepared as follows:
A sodium aluminosilicate-water mixture is prepared such that the initial composition of the reactant mixture, in terms of oxide-mole-ratios, falls within any one of the following seven ranges:

| | I | II | III | IV | V | VI | VII |
|---|---|---|---|---|---|---|---|
| Na$_2$O/SiO$_2$ | 0.20 to 0.40 | 0.41 to 0.60 | 0.61 to 0.80 | 0.81 to 1.0 | 0.81 to 1.0 | 1.7 to 1.9 | 1.2 to 1.4 |
| SiO$_2$/Al$_2$O$_3$ | about 4 | 3.5 to 6.0 | 3.5 to 6.5 | 3 to 4.5 | about 30 | 10 to 25 | about 6 |
| H$_2$O/Na$_2$O | 22 to 60 | 30 to 60 | 40 to 80 | 40 to 80 | 50 to 60 | 60 to 70 | 80 to 90 |

The mixture is maintained at a temperature within the range of about 100° C. to 120° C. until crystals are formed; the crystals are then separated from the mother liquor.

The chemical formula for zeolite S may be written as:

$$0.9 \pm 0.2 \text{Na}_2\text{O}:\text{Al}_2\text{O}_3:W\text{SiO}_2:X\text{H}_2\text{O}$$

wherein "W" is from 4.6 to 5.9 and "X," for the fully hydrated form, is from about 6 to 7.

Zeolite S has a characteristic X-ray powder diffraction pattern which may be employed to identify zeolite S. The X-ray powder diffraction data are shown in Table G.

TABLE G

*X-ray diffraction patterns of synthetic zeolite S*

[$d$=interplanar spacing in A.; I/I max.=relative intensity]

| $d$, A. | 100 (I/I max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 |

Zeolite S may be prepared by preparing a sodium aluminosilicate-water mixture such that the composition of the reactant mixture, in terms of oxide-mole-ratios, falls within the following range when the source of silica is an aqueous colloidal silica sol:

| | |
|---|---|
| $Na_2O/SiO_2$ | 0.3 to 0.6 |
| $SiO_2/Al_2O_3$ | 6 to 10 |
| $H_2O/Na_2O$ | 20 to 100 | and falls within the following range when the source of silica is sodium silicate:

| | |
|---|---|
| $Na_2O/SiO_2$ | about 0.5 |
| $SiO_2/Al_2O_3$ | about 25 |
| $H_2O/Na_2O$ | about 18 | maintaining the mixture at a temperature in the range of from about 80° C. up to about 120° C., preferably at about 100° C., and at a pressure at least equal to the vapor pressure of water in equilibrium with the mixture of reactants until crystals are formed, and separating the crystals from the mother liquor.

The chemical formula for zeolite T may be written, in terms of mole ratios of oxides, as follows:

$$1.1 \pm 0.4[xNa_2O:(1-x)K_2O]:Al_2O_3:6.9 \pm 0.5 SiO_2:yH_2O$$

wherein "$x$" may be any value from about 0.1 to about 0.8, and "$y$" may be any value from about 0 to about 8. Zeolite T may be identified and distinguished from other zeolites, and other crystalline substances, by its X-ray powder diffraction pattern. The data which are set forth below in Table H are for a typical example of zeolite T.

TABLE H

| Bragg Angle, $2\theta$ | Interplanar Spacing, $d$(A.) | Relative Intensity, $100 I/I_0$ |
|---|---|---|
| 7.72 | 11.45 | 100 |
| 9.63 | 9.18 | 4 |
| 11.74 | 7.54 | 13 |
| 13.35 | 6.63 | 54 |
| 14.74 | 6.01 | 2 |
| 15.44 | 5.74 | 6 |
| 17.78 | 4.99 | 2 |
| 19.43 | 4.57 | 8 |
| 20.46 | 4.34 | 45 |
| 21.35 | 4.16 | 3 |
| 21.78 | 4.08 | 2 |
| 23.27 | 3.82 | 16 |
| 23.64 | 3.76 | 56 |
| 24.28 | 3.67 | 1 |
| 24.82 | 3.59 | 30 |
| 26.04 | 3.42 | 2 |
| 26.92 | 3.31 | 16 |
| 28.04 | 3.18 | 12 |
| 28.29 | 3.15 | 18 |
| 30.47 | 2.93 | 11 |
| 31.15 | 2.87 | 38 |
| 31.38 | 2.85 | 45 |
| 33.41 | 2.68 | 11 |
| 34.32 | 2.61 | 2 |
| 35.83 | 2.51 | 8 |
| 36.09 | 2.49 | 13 |
| 39.26 | 2.30 | 2 |
| 40.81 | 2.21 | 6 |
| 42.61 | 2.12 | 5 |
| 43.33 | 2.09 | 3 |
| 45.58 | 1.99 | 2 |
| 46.30 | 1.96 | 2 |
| 48.17 | 1.89 | 8 |
| 48.84 | 1.86 | 2 |
| 49.61 | 1.84 | 4 |
| 51.44 | 1.78 | 8 |
| 51.58 | 1.77 | 5 |
| 52.29 | 1.75 | 2 |
| 53.68 | 1.71 | 3 |
| 55.40 | 1.66 | 9 |
| 58.03 | 1.59 | 5 |
| 60.82 | 1.52 | 1 |
| 61.48 | 1.51 | 2 |
| 63.29 | 1.47 | 3 |
| 66.24 | 1.41 | 1 |
| 67.65 | 1.38 | 3 |

Zeolite T may be prepared by preparing an aqeous sodium-potassium aluminosilicate mixture having a composition, expressed in terms of mole ratios of oxides, falling within the following range:

| | |
|---|---|
| $Na_2O/(Na_2O+K_2O)$ | From about 0.7 to about 0.8. |
| $(Na_2O+K_2O)/SiO_2$ | From about 0.4 to about 0.5. |
| $SiO_2/Al_2O_3$ | About 20 to 28. |
| $H_2O/(Na_2O+K_2O)$ | About 40 to 42. | maintaining the mixture at a temperature of about 100° C. until crystallization occurs, and separating the crystals from the mother liquor.

To prepare the elemental metal-containing zeolitic molecular sieves by the process of the present invention, it is first necessary to activate the zeolitic molecular sieves, i.e., to drive off substantially all of the contained water, prior to reduction of the metal cations to the elemental metal. This may be accomplished by heating the zeolitic molecular sieves containing the proper metal cation up to a temperature of about 350° C. in a flowing stream of inert dry gas or in a vacuum. The activated molecular sieve is then ready for reduction of the cations to the elemental metal. It has been found that the most satisfactory dispersion of the elemental metal throughout the adsorption region of the zeolitic molecular sieves is obtained if substantially all of the water is removed from the molecular sieves prior to the reduction step. When the molecular sieves are only partially dehydrated, the products are still usable, but will not have the metal as well dispersed, thereby reducing the specific surface of the metal in the molecular sieves with a corresponding reduction in the surface activity of the contained metal.

In accordance with the process of the present invention, a zeolitic molecular sieve capable of adsorbing a substantial amount of oxygen at the normal boiling point of oxygen is ion exchanged by contacting the molecular sieve with an aqueous solution of water-soluble salt of the metal to be reduced to the elemental state. When sufficient ion exchange occurs, the exchanged zeolite is removed from contact with the exchanging solution, dried, and activated by the methods described previously.

The activated molecular sieve is then treated with a suitable reducing agent. Alkali metal vapors, and preferably gaseous hydrogen, are suitable reducing agents for the process of the present invention. The reduction may be accomplished by passing the gaseous or vaporous reducing agent through a bed of the ion-exchanged, activated zeolitic molecular sieves. In the case of the alkali metals, it is sufficient to mix the molten alkali metals with the ion-exchanged activated zeolite; sufficient vapors are given off by the molten metal to effect the reduction.

The reduction should be effected in an inert atmosphere as should be the subsequent cooling of the material. The maximum temperature of reduction must be below the temperature at which the crystal structure of the zeolitic molecular sieve is destroyed.

The metals which may be loaded into the zeolite molecular sieves by the present process are copper, silver, cadmium, mercury, thallium, tin, lead, iron, cobalt, and nickel. Most satisfactory results have been obtained with silver, nickel, cobalt, iron, and copper.

EXAMPLE I

Zeolite X (100 grams) was placed in a 16-millimeter inside diameter glass column to a bed depth of 70 centimeters. A 0.22 molar nickel nitrate solution (128 grams $Ni(NO_3)_2 \cdot 6H_2O$ in 2 liters water) was passed up through this column at a rate of 10 milliliters per minute. The zeolite was washed after completion of exchange by passing 500 milliliters distilled water through the column. The zeolite was then removed from the column and dried at 100° C. X-ray diffraction analysis showed the crystal structure of the zeolite to be intact.

The nickel-exchanged zeolite was placed in a vertical tube and heated under a hydrogen purge of 0.5 cubic foot per hour at 300–350° C. for three hours until dehydrated. The temperature was then increased to 500° C. for three hours while still under hydrogen purge to accomplish hydrogen reduction of the nickel-exchanged zeolite. The zeolite was then cooled overnight under 5 p.s.i.g. hydrogen. The product was uniformly black and X-ray diffraction analysis of the zeolite indicated the presence of elemental nickel. Chemical analysis of the product indicated 8.6 weight-percent nickel.

EXAMPLE II

Zeolite X powder (314 grams) was slurried at room temperature with two liters of 0.2 molar silver nitrate (containing 68 grams $AgNO_3$). After the exchange reaction was complete, the zeolite was washed with water until the wash effluent was free of silver-ions. The zeolite was then dried at 110° C. Chemical analysis of the zeolite indicated the presence of 11.3 percent silver.

The silver-exchanged zeolite X was heated in a nitrogen purge at 350° C. for 2 hours. After cooling the zeolite to 200° C., hydrogen was admitted at about 1 cubic foot per hour and the heating continued for one hour. The white silver-exchanged zeolite X turned black in the presence of hydrogen. An exposure of the silver-loaded zeolite X to air, after reduction, changed the color from black to yellow-brown. X-ray diffraction analysis of the product after reduction showed the crystal structure to be intact and the elemental silver present had a particle size of less than $10^{-6}$ centimeters.

EXAMPLE III

A solution of mercuric nitrate was prepared by dissolving 90 grams of $Hg(NO_3)_2 \cdot H_2O$ in one liter of water. About 6 grams of $NaNO_3$ was added as a buffering agent and concentrated acetic acid was added until the solution was clear.

Zeolite X powder (100 grams) was slowly added to the above solution and then allowed to stand for 1½ hours. The zeolite was then filtered, washed and dried at 100° C. for two hours.

The mercury-exchanged zeolite containing 57.4 weight-percent mercury was placed in a horizontal tube furnace and heated under a hydrogen purge of 5 cubic feet per hour. The bed was heated at 100° C. for 1½ hours and then allowed to cool overnight. The bed was then heated at 110–200° C. for 1½ hours, then at 200–220° C. for five hours, all under a hydrogen purge of 5 cubic feet per hour. The bed was cooled overnight and then heated at 200–350° C. for 2½ hours under a hydrogen purge of 5 cubic feet per hour and allowed to cool to room temperature. The bed color changed from yellow to gray during the action. Even though an appreciable amount of mercury was distilled out of the zeolite, the zeolite product contained 2.5 weight-percent mercury.

EXAMPLE IV

A solution of cadmium nitrate was prepared by dissolving 80 grams of $Cd(NO_3)_2 \cdot 4H_2O$ in one liter of distilled water. This solution was mixed with 100 grams of zeolite X and allowed to stand for 2¼ hours. The zeolite was then filtered and dried at 100° C. for two hours.

The cadmium-exchanged zeolite containing 17.9 weight-percent cadmium was placed in a horizontal tube furnace and heated at 90–230° C. for two hours under 2–3 cubic feet per hour hydrogen. The bed color changed from white to yellow. Chemical analysis of the zeolite product indicated that it contained 16.6 weight-percent cadmium. On further heating at temperatures up to 550° C. for 5½ hours some of the cadmium metal was distilled out. The zeolite color turned to white, and the cadmium content dropped to 14.8 percent.

EXAMPLE V

A solution of lead nitrate was prepared by dissolving 86 grams of $Pb(NO_3)_2$ in one liter of distilled water. This solution was then slurried with 100 grams of zeolite X for one hour. The zeolite was then filtered and dried at 100° C. Chemical analysis indicated that the lead-exchanged zeolite X contained 31.4 weight-percent lead.

The lead-exchanged zeolite was placed in a horizontal tube furnace and heated under 2 cubic feet per hour hydrogen at 110–360° C. for 1½ hours and at 200–475° C. for seven hours. The bed color changed from white to black. Chemical analysis of the product indicated that it contained 36.4 weight-percent lead. X-ray diffraction analysis of the product showed that the crystal structure was intact and elemental lead was present.

EXAMPLE VI

A solution of copper nitrate was prepared by dissolving 12.1 grams $Cu(NO_3)_2 \cdot 3H_2O$ in one liter of distilled water. This solution was mixed with 100 grams of zeolite X and allowed to stand for ten minutes. The zeolite was filtered and dried overnight at 100° C.

The copper-exchanged zeolite containing 3.0 weight-percent copper was placed in a horizontal tube furnace and heated under 2 cubic feet per hour hydrogen at 100–265° C. for eight hours and then at 235–450° C. for four hours. The bed color changed from light blue to pink-rose. Chemical analysis of the dried product indicated 3.5 weight-percent copper. X-ray diffraction analysis of the product showed no crystallographic decomposition.

EXAMPLE VII

A solution of iron nitrate was prepared by dissolving 20.2 grams $Fe(NO_3)_3 \cdot 9H_2O$ in one liter distilled water. This solution was slurried with 100 grams zeolite X and allowed to stand for ten minutes. The zeolite was filtered and dried at 100° C. for three hours.

This iron-exchanged zeolite containing 2.4 weight percent iron was then placed in a horizontal tube furnace and heated under 2 cubic feet per hour hydrogen at 100–320° C. for ten hours. The bed color changed from yellow-brown to gray-brown. Chemical analysis of the product indicated 3.2 weight-percent iron. X-ray diffraction analysis of the product showed no crystallographic decomposition.

EXAMPLE VIII

Zeolite A powder (80 grams) was slurried at room temperature into 860 milliliters of 0.2 M silver nitrate solution (contained 28.2 grams $AgNO_3$). The mixture was allowed to stand about ½ hour and was then filtered. The solid was then washed with water until free of silver. The solid was then dried at 100° C.

The silver-exchanged zeolite A containing 19.9 weight-percent silver was placed in a horizontal tube furnace and dehydrated by heating at 350–400° C. for 1¾ hours. The zeolite was then cooled to room temperature. Hydrogen (0.5 cubic foot per hour) was passed through the bed for 20 minutes. The bed turned yellow-brown. The zeolite was heated to 100–200° C. while passing hydrogen through it for 25 minutes. The product had a uniformly dark brown color and contained 23.5 weight-percent silver. X-ray diffraction analysis of the silver A zeolite after reduction indicated that hydrogen exchange had occurred and that elemental silver was present.

EXAMPLE IX

A sample of mordenite (in the form of beach pebbles found in Nova Scotia) with an approximate composition of $RO \cdot Al_2O_3 \cdot 10SiO_2 \cdot 6H_2O$ where R is $(Na^+)_2$ and $Ca^{++}$, was ground to pass through a 150 mesh screen. A 7.6 gram portion of this powder was mixed with 150 milliliters aqueous solution containing 1.5 grams of silver nitrate. This mixture was allowed to stand with frequent agitation for 1½ hours. It was then filtered and washed with water until the filtrate gave a negative test for silver ion. The zeolite was dried at 110° C.

The silver-exchanged mordenite was placed in a horizontal tube furnace and heated at 350° C. for 3 hours in a stream of hydrogen gas. Chemical analysis of the product indicated that it contained 9.3 weight-percent silver. The structure of the crystal was indicated by X-ray diffraction techniques to be a hydrogen-exchanged form of mordenite.

EXAMPLE X

A quantity (15 grams) of sodium zeolite X powder was put into 500 milliliters of an aqueous solution of thallous sulphate (18 grams per liter of solution) and the suspension was stirred for 20 minutes. The zeolite powder was filtered from the solution and washed with distilled water. The washed zeolite was then dehydrated by heating to 375° C. under reduced pressure. A few grams of the activated, thallous-exchanged, zeolite powder were mixed with a few grams of metallic sodium in a 250 ml. flask and heated to a temperature in the range of 150° C. to 180° C. with continuous stirring under an argon atmosphere. The final product was black in color and contained 31 weight percent of thallium. The presence of thallium metal was confirmed by X-ray.

The reduction of zeolitic molecular sieves as illustrated by Examples I through X can be employed to make a metal-containing zeolitic molecular sieve only when a suitable stable cation of the metal to be introduced into the molecular sieve is available. This requirement cannot always be met. For example, platinum occurs in simple ionic salts in the anionic part of the salt. Thus the usual cation-exchange techniques for introducing platinum into the crystal structure of a zeolitic molecular sieve cannot be employed. In some instances, notably with chromium ions, the simple cation is not stable except in acidic solutions which destroy the crystal structure of the zeolitic molecular sieve.

In the previous examples, the reducing agents are oxidized to cations which take up the cation position in the zeolitic molecular sieve structure which had been occupied by the cation which was concomitantly reduced. However, it has been found that zeolitic molecular sieve cations may be reduced by reducing agents which are not oxidized to cations even though there are no obvious cations to replace them. This may be illustrated by the following examples.

EXAMPLE XI

Hydrated Cu(II) X zeolite (15 grams) containing 12.2 weight-percent Cu on an anhydrous basis was placed in a 1 inch Pyrex tube. The tube was controlled at 375° C. in a split tube furnace for 2½ hours in a stream of nitrogen. The tube was then cooled to 350° C. and a stream of carbon monoxide was continued for 2½ hours during which time the zeolite changed from light blue to light purple. This color change is indicative of reduction. The sample was cooled in nitrogen. It was removed and submitted for analysis without exposure to air. The analysis showed 9.4 weight-percent copper metal on an anhydrous basis.

A sample of the same starting zeolite was treated under identical conditions of temperature and time with hydrogen instead of carbon monoxide. The reduction took place much more rapidly than with carbon monoxide. Analysis of this sample showed 9.8 weight-percent copper metal on an anhydrous basis.

In this case, it is believed that hydrogen ions were obtained from residual water remaining in the zeolitic molecular sieve after the activation step.

EXAMPLE XII

Hydrated Cu(II) X zeolite (25 grams) containing 12.2 weight-percent Cu on an activated basis was suspended in 200 ml. distilled water in a 500 ml. 3-necked flask fitted with a condenser, a thermometer, and a stirrer. An inert atmosphere was maintained over the suspension. Hydrazine hydrochloride (5.25 grams, .05 mole) was added to the suspension. A solution of sodium hydroxide (4.0 grams, .1 mole) was added dropwise over a period of 30 minutes. Copious amounts of gas, presumably nitrogen, were evolved. The zeolite first turned colorless, probably forming the copper (I) X zeolite, and then deep red brown. The mixture was heated to 100° C. to insure complete reaction and destruction of excess hydrazine. The zeolite was filtered and washed with water and acetone under an inert atmosphere. It was extremely reactive in air, turning light blue in a few minutes. A sample was heated to 350° C. in vacuo for 2½ hours. No visible change occurred. Analysis showed 8.1 weight-percent copper metal on an anhydrous basis and less than 0.1 percent nitrogen.

The maximum metal that may be incorporated in the zeolitic molecular sieves by the process of the present invention is limited by the extent to which the molecular sieves may be ion-exchanged with the desired cations. However, since the metals are distributed throughout the molecular sieves according to the location of the ion-exchange site of the crystals, it is possible to obtain a high degree of dispersion of the metal throughout the crystals and the contained metal has a very high specific surface.

The products produced by the process of the present invention are quite useful as catalysts, and particularly as selective catalysts for the specific catalysts of reactants which are mixed with other materials which are not adsorbed by the zeolitic molecular sieve. The adsorbed reactants react leaving the non-adsorbed materials unreacted.

Similarly, the products are useful as selective getters, gettering certain components of a mixture without affecting the other components.

The metal-containing zeolitic molecular sieves are useful as a means for effecting the controlled addition of metals to reaction systems.

Still another advantage of the use of metal-loaded zeolitic molecular sieves resides in the fact that the tendency for the metal to migrate is minimized. Normal catalysts consisting of supported metals exhibit migration of the metal during catalysis thereby giving rise to unequal distribution of catalyst material with a corresponding decrease in catalytic effectiveness.

As used herein the term "activation" is employed to designate the removal of water from the zeolitic molecular sieves, i.e., dehydration, and does not refer to catalytic activity. The zeolitic molecular sieves containing the elemental metal exhibit catalytic activity.

The process of the present invention provides materials having surface areas about four times that expected with most alumina, silica or aluminosilicate supported metals thereby providing a greater surface area available for reaction. Since the external surface of the molecular sieve represents less than 1 percent of the total surface area it may be seen that there is an extremely large area available for chemisorption and catalysis in the internal portion of the molecular sieve. Since this region is available only through pores of molecular size it may be seen that selective chemisorption and catalysis may be obtained in a system containing a mixture of molecules some of which are too large to enter the pores whereas others are capable of entering the pores.

Zeolite A is described and claimed in U.S. Patent No. 2,882,243, issued April 14, 1959, to R. M. Milton.

Zeolite D is described and claimed in U.S. patent application Serial No. 680,383, filed August 26, 1957.

Zeolite L is described and claimed in U.S. patent application Serial No. 711,565, filed January 28, 1958.

Zeolite R is described and claimed in U.S. patent application Serial No. 680,381, filed August 26, 1957.

Zeolite S is described and claimed in U.S. patent application Serial No. 724,843, filed March 31, 1958.

Zeolite T is described and claimed in U.S. Patent No. 2,950,952, issued August 30, 1960, to D. W. Breck and N. A. Acara.

Zeolite X is described and claimed in U.S. Patent No. 2,882,244, issued April 14, 1959, to R. M. Milton.

Zeolite Y is described and claimed in U.S. patent application Serial No. 728,057, filed April 14, 1958.

Synthetic zeolites A, X, and Y, and natural zeolite faujasite have been found to be most satisfactory and useful for the purposes of the present invention.

Erionite is a naturally occurring zeolite, described originally by Eakle, Am. J. Science (4), 6, 66 (1898). It is most readily identified by its characteristic X-ray powder diffraction pattern. The $d$-spacings, in A., and relative intensities thereof, obtained on a well-crystallized specimen are tabulated below.

*X-ray powder data, erionite*

| $d$-spacing, A. | Relative Intensity, $I/I_0 \times 100$ |
|---|---|
| 11.38 | 100 |
| 9.06 | 10 |
| 7.50 | 10 |
| 6.56 | 40 |
| 6.24 | 10 |
| 5.68 | 10 |
| 5.34 | 10 |
| 4.56 | 10 |
| 4.31 | 40 |
| 4.15 | 20 |
| 3.80 | 20 |
| 3.74 | 40 |
| 3.58 | 30 |
| 3.30 | 10 |
| 3.27 | 10 |
| 3.20 | 10 |
| 3.16 | 10 |
| 3.14 | 10 |
| 3.00 | 5 |
| 2.92 | 5 |
| 2.86 | 30 |
| 2.83 | 30 |
| 2.805 | 20 |
| 2.67 | 10 |
| 2.59 | 5 |
| 2.49 | 10 |
| 2.47 | 10 |
| 2.20 | 5 |
| 2.11 | 5 |
| 1.88 | 5 |
| 1.83 | 5 |
| 1.77 | 10 |
| 1.65 | 10 |

What is claimed is:

1. A process for preparing an elemental metal-containing rigid three-dimensional crystalline metal aluminosilicate zeolite of the molecular sieve type which comprises intimately contacting a rigid three-dimensional crystalline metal aluminosilicate zeolite of the molecular sieve type capable of adsorbing oxygen internally at the normal boiling point of oxygen with an aqueous solution of a water-soluble salt having stable cations of a metal to be deposited in the inner adsorption area of said crystalline metal aluminosilicate zeolite whereby ion-exchange occurs between the exchangeable cations of the crystalline metal aluminosilicate zeolite and the metal cations present in said aqueous solution, said stable cations capable of being reduced at a temperature below the crystal destruction temperature of said crystalline metal aluminosilicate zeolite; separating the crystalline metal aluminosilicate zeolite from the aqueous exchanging solution; drying to partially dehydrate said cation exchanged crystalline metal aluminosilicate zeolite; and intimately contacting said dried ion-exchanged crystalline metal aluminosilicate zeolite with a reducing agent whereby the exchanged metal cations present in said crystalline metal aluminosilicate zeolite structure are reduced to elemental metal.

2. A process for preparing an elemental metal-containing rigid three dimensional crystalline metal aluminosilicate zeolite of the molecular sieve type which comprises intimately contacting a rigid three dimensional crystalline metal aluminosilicate zeolite of the molecular sieve type capable of adsorbing oxygen internally at the normal boiling point of oxygen with an aqueous solution of a water-soluble salt of the metal chosen from the group consisting of silver, nickel, cobalt, iron, copper, cadmium, mercury, thallium, tin and lead to be deposited in the inner adsorption area of said crystalline metal aluminosilicate zeolite whereby ion-exchange occurs between the exchangeable cations of said crystalline metal aluminosilicate zeolite and the metal cations present in said aqueous solution; separating the cation-exchanged crystalline metal aluminosilicate zeolite from the aqueous exchanging solution, activating said cation-exchanged crystalline metal aluminosilicate zeolite by drying the zeolite sufficiently to remove substantially all of the water therefrom; and intimately contacting the activated, cation-exchanged crystalline metal aluminosilicate zeolite with a reducing agent whereby the exchanged metal cations present in the activated, cation-exchanged crystalline metal aluminosilicate zeolite structure are reduced to elemental metal, said reduction being accomplished at temperatures below the destruction temperature of said rigid three-dimensional crystalline metal aluminosilicate zeolite of the molecular sieve type.

3. A process as described in claim 2 wherein the elemental metal is silver.

4. A process as described in claim 2 wherein the elemental metal is nickel.

5. A process as described in claim 2 wherein the elemental metal is cobalt.

6. A process as described in claim 2 wherein the elemental metal is iron.

7. A process as described in claim 2 wherein the elemental metal is copper.

8. A process for preparing an elemental metal-containing rigid three-dimensional crystalline metal aluminosilicate of the molecular sieve type which comprises intimately contacting a rigid three-dimensional crystalline metal aluminosilicate zeolite of the molecular sieve type chosen from the group consisting of zeolite A, zeolite D, zeolite L, zeolite R, zeolite S, zeolite T, zeolite X, zeolite Y, chabazite, faujasite, erionite, mordenite, gmelinite and the calcium form of analcite with an aqueous solution of a water soluble salt having stable cations of a metal to be deposited in the inner adsorption area of said crystalline metal aluminosilicate zeolite whereby ion-exchange occurs between the exchangeable cations of said crystalline metal aluminosilicate zeolite and the metal cations present in said aqueous solution, said stable cations capable of being reduced at a temperature below the crystal destruction temperature of said crystalline metal aluminosilicate zeolite; separating the cation-exchanged crystalline metal aluminosilicate zeolite from the aqueous exchanging solution; activating said cation-exchanged crystalline metal aluminosilicate zeolite by drying to partially dehydrate the zeolite; and intimately contacting the activated, cation-exchanged crystalline metal aluminosilicate zeolite with a reducing agent whereby the exchanged metal cations present in the activated, cation-exchanged crystalline metal aluminosilicate zeolite structure are reduced to elemental metal, said reduction being accomplished at temperatures below the destruction temperature of said rigid three-dimensional crystalline metal aluminosilicate zeolite of the molecular sieve type.

9. A process as described in claim 8 wherein the rigid three-dimensional crystalline metal aluminosilicate zeolite of the molecular sieve type chosen is zeolite A.

10. A process as described in claim 8 wherein the rigid three-dimensional crystalline metal aluminosilicate zeolite of the molecular sieve type chosen is zeolite X.

11. A process as described in claim 8 wherein the rigid three-dimensional crystalline metal aluminosilicate zeolite of the molecular sieve type chosen is mordenite.

References Cited in the file of this patent

UNITED STATES PATENTS

| | | |
|---|---|---|
| 1,840,450 | Jaeger et al. | Jan. 12, 1932 |
| 2,306,610 | Barrer | Dec. 19, 1942 |
| 2,413,134 | Barrer | Dec. 24, 1946 |
| 2,617,712 | Bond | Nov. 11, 1952 |
| 2,882,243 | Milton | Apr. 14, 1959 |
| 2,882,244 | Milton | Apr. 14, 1959 |